(12) United States Patent
Wu et al.

(10) Patent No.: US 11,497,078 B2
(45) Date of Patent: Nov. 8, 2022

(54) APPARATUS AND METHOD FOR DRX MECHANISMS FOR SINGLE HARQ PROCESS OPERATION IN NB-IOT

(71) Applicant: Nokia Technologies Oy, Espoo (FI)

(72) Inventors: Chunli Wu, Beijing (CN); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/076,835

(22) PCT Filed: Jan. 24, 2017

(86) PCT No.: PCT/IB2017/050363
§ 371 (c)(1),
(2) Date: Aug. 9, 2018

(87) PCT Pub. No.: WO2017/137861
PCT Pub. Date: Aug. 17, 2017

(65) Prior Publication Data
US 2019/0053322 A1    Feb. 14, 2019

Related U.S. Application Data

(60) Provisional application No. 62/294,620, filed on Feb. 12, 2016.

(51) Int. Cl.
*H04W 76/28* (2018.01)
*H04W 4/00* (2018.01)
(Continued)

(52) U.S. Cl.
CPC ............. *H04W 76/28* (2018.02); *H04L 1/188* (2013.01); *H04L 1/1812* (2013.01);
(Continued)

(58) Field of Classification Search
CPC ..... H04L 1/1812; H04L 1/1864; H04L 1/188; H04L 1/1896; H04W 4/00; H04W 72/0406; H04W 76/28
See application file for complete search history.

(56) References Cited

U.S. PATENT DOCUMENTS

2009/0046650 A1* 2/2009 Dalsgaard ............. H04L 1/1819
370/329
2017/0134124 A1* 5/2017 Lee ........................... H04L 1/08
(Continued)

FOREIGN PATENT DOCUMENTS

EP    3414859 A1    12/2018
JP    2019-054310 A    4/2019
(Continued)

OTHER PUBLICATIONS

Office action received for corresponding Canadian Patent Application No. 3014152, dated Jun. 18, 2019, 4 pages.
(Continued)

*Primary Examiner* — Jason E Mattis
*Assistant Examiner* — Bao G Nguyen
(74) *Attorney, Agent, or Firm* — Squire Patton Boggs (US) LLP

(57) ABSTRACT

One embodiment is directed to a method comprising determining if a HARQ RTT timer for a downlink HARQ process expires; if the HARQ RTT timer for the downlink HARQ process is determined expired, determining if the data of the corresponding downlink HARQ process was successfully decoded; starting a drx-retransmission timer for the corresponding downlink HARQ process if the data of the corresponding downlink HARQ process was not successfully decoded; and (re)starting a drx-inactivity timer if the data of the corresponding downlink HARQ process was successfully decoded; determining if a HARQ RTT timer for a uplink HARQ process expires; if the HARQ RTT timer for
(Continued)

the uplink HARQ process is determined expired, starting a drx-retransmission timer for the corresponding uplink HARQ process.

20 Claims, 3 Drawing Sheets

(51) Int. Cl.
*H04L 1/18* (2006.01)
*H04W 72/04* (2009.01)

(52) U.S. Cl.
CPC .......... *H04L 1/1864* (2013.01); *H04L 1/1896* (2013.01); *H04W 4/00* (2013.01); *H04W 72/0406* (2013.01)

(56) References Cited

U.S. PATENT DOCUMENTS

2017/0202054 A1* 7/2017 Rathonyi .............. H04L 5/0055
2019/0037637 A1* 1/2019 Suzuki .............. H04W 52/0229
2019/0053322 A1 2/2019 Wu et al.

FOREIGN PATENT DOCUMENTS

WO 2014/109769 A1 7/2014
WO 2017/137861 A1 8/2017

OTHER PUBLICATIONS

Office action received for corresponding Japanese Patent Application No. 2018-542222, dated Jun. 18, 2019, 3 pages of office action and 3 pages of translation available.
"Introduction of NB-IoT in 36.321", 3GPP TSG-RAN2 meeting #94, R2-164396, Ericsson, May 23-27, 2016, 32 pages.
Office action received for corresponding Vietnam Patent Application No. 1-2018-03945, dated Oct. 4, 2018, 1 pages of office action and 1 pages of office action translation available.
"New Study Item on Cellular System Support for Ultra Low Complexity and Low Throughput Internet of Things", 3GPP TSG-GERAN meeting #62, GP-140421, Agenda: 11.1, VODAFONE Group Plc., May 26-30, 2014, 6 pages.
"3rd Generation Partnership Project; Technical Specification Group GSM/EDGE Radio Access Network; Cellular system support for ultra-low complexity and low throughput Internet of Things (CIoT) (Release 13)", 3GPP TR 45.820, V13.1.0, Nov. 2015, pp. 1-495.
"New Work Item: NarrowBand IOT (NB-IOT)", 3GPP TSG-RAN Meeting #69, RP-151621, Agenda: 14, Qualcomm Incorporated, Sep. 14-16, 2015, 8 pages.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321, V13.0.0, Dec. 2015, pp. 1-82.
International Search Report and Written Opinion received for corresponding Patent Cooperation Treaty Application No. PCT/IB2017/050363, dated Mar. 6, 2017, 13 pages.
"Connected Mode DRX for NB-IoT", 3GPP TSG-RAN WG2 Meeting NB-IOT ad-hoc, R2-160471, Agenda: 6.1, Ericsson, Jan. 19-21, 2016, pp. 1-7.
"Email Discussion Report on [NBAH#06][NBIOT/DRX] DRX Dormancy", 3GPP TSG-RAN WG2 Meeting #93, R2-161638, Agenda: 7.16.3.1, Ericsson, Feb. 15-19, 2016, pp. 1-13.
Extended European Search Report received for corresponding European Patent Application No. 17749939.9, dated Sep. 12, 2019, 7 pages.
Office Action dated Apr. 28, 2020 corresponding to Canadian Patent Application No. 3,014,152.
Ndian Office Action corresponding to IN Appln. No. 201847032199, dated Nov. 18, 2020.
Canadian Office Action, corresponding to CA Application No. 3,014,152, dated Feb. 18, 2021.
European Communication pursuant to Article 94(3) EPC, corresponding to EP Application No. 17 749 939.9, dated Jun. 14, 2021.
Thai Office Action, with partial English translation, corresponding to Thailand Patent Application No. 1801004757, dated May 30, 2022.
Canadian Office Action issued in corresponding Canadian Patent Application No. 3,014,152 dated Nov. 5, 2021.
Vietnamese Office Action corresponding to VN Application No. 1-2018-03945, dated Jan. 28, 2022.
Vietnamese Office Action corresponding to VN Application No. 1-2018-03945, dated Jun. 24, 2022.

* cited by examiner

APPARATUS AND METHOD FOR DRX MECHANISMS FOR SINGLE HARQ PROCESS OPERATION IN NB-IOT

RELATED APPLICATION

This application was originally filed as Patent Cooperation Treaty Application No. PCT/IB2017/050363 filed Jan. 24, 2017 which claims priority benefit to U.S. Provisional Patent Application No. 62/294,620, filed Feb. 12, 2016.

CROSS-REFERENCE TO RELATED APPLICATION

This application is related to and claims the benefit and priority of U.S. Provisional Patent Application No. 62/294,620, filed Feb. 12, 2016, the entirety of which is hereby incorporated herein by reference.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Third generation partnership project (3GPP) long term evolution (LTE) and its next generation LTE advanced (LTE-A) provide significantly enhanced services of existing mobile telecommunications system by means of higher data rates and lower latency with reduced cost. LTE-A will be a more optimized radio system fulfilling the international telecommunication union radio communication sector requirements for international mobile telecommunications—advanced, while maintaining backward compatibility with the current LTE release.

Machine to Machine (M2M) communication represents a significant growth opportunity for the 3GPP ecosystem. To support the so called internet of things (IoT), 3GPP operators have to address usage scenarios with devices that are power efficient (with battery life of several years), can be reached in challenging coverage conditions e.g. indoor and basements and, more importantly, are cheap enough so that they can be deployed on a mass scale and even be disposable. A study item in 3GPP was recently approved. The aim was to study both the possibility of evolving current system and the design of a new access system towards low complexity and low throughput radio access technology to address the requirements of cellular internet of things. The objectives of the study were: improved indoor coverage, support for massive number of low throughput devices, low delay sensitivity, ultra-low device cost, low device power consumption and (optimized) network architecture. The deployment of narrow band (NB) IoT may be inband LTE, a guard band to LTE, UMTS or other system as well as stand-alone on a specific carrier.

BACKGROUND

According to a first embodiment, a method may include determining whether a user equipment is a narrow band internet of things (NB-IoT) user equipment; determining whether a hybrid automatic repeat request round trip time (HARQ RTT) timer expires; and if the user equipment is a NB-IoT user equipment and the HARQ RTT timer expires, starting or restarting a discontinuous reception (DRX) inactivity timer.

According to a second embodiment, an apparatus can include at least one processor and at least one memory and computer program code. The at least one memory and the computer program code can be configured to, with the at least one processor, cause the apparatus at least to determine whether a user equipment is a narrow band internet of things (NB-IoT) user equipment; determine whether a hybrid automatic repeat request round trip time (HARQ RTT) timer expires; and if the user equipment is a NB-IoT user equipment and the HARQ RTT timer expires, start or restart a discontinuous reception (DRX) inactivity timer.

According to a third embodiment, an apparatus can include means for performing the method according to the first embodiment.

According to a fourth embodiment, a computer program product may comprise a computer readable medium bearing computer program code for performing a process including the method according to the first embodiment.

According to a fifth embodiment, a non-transitory computer readable medium may store instructions that, when executed in hardware, perform a process including the method according to the first embodiment.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
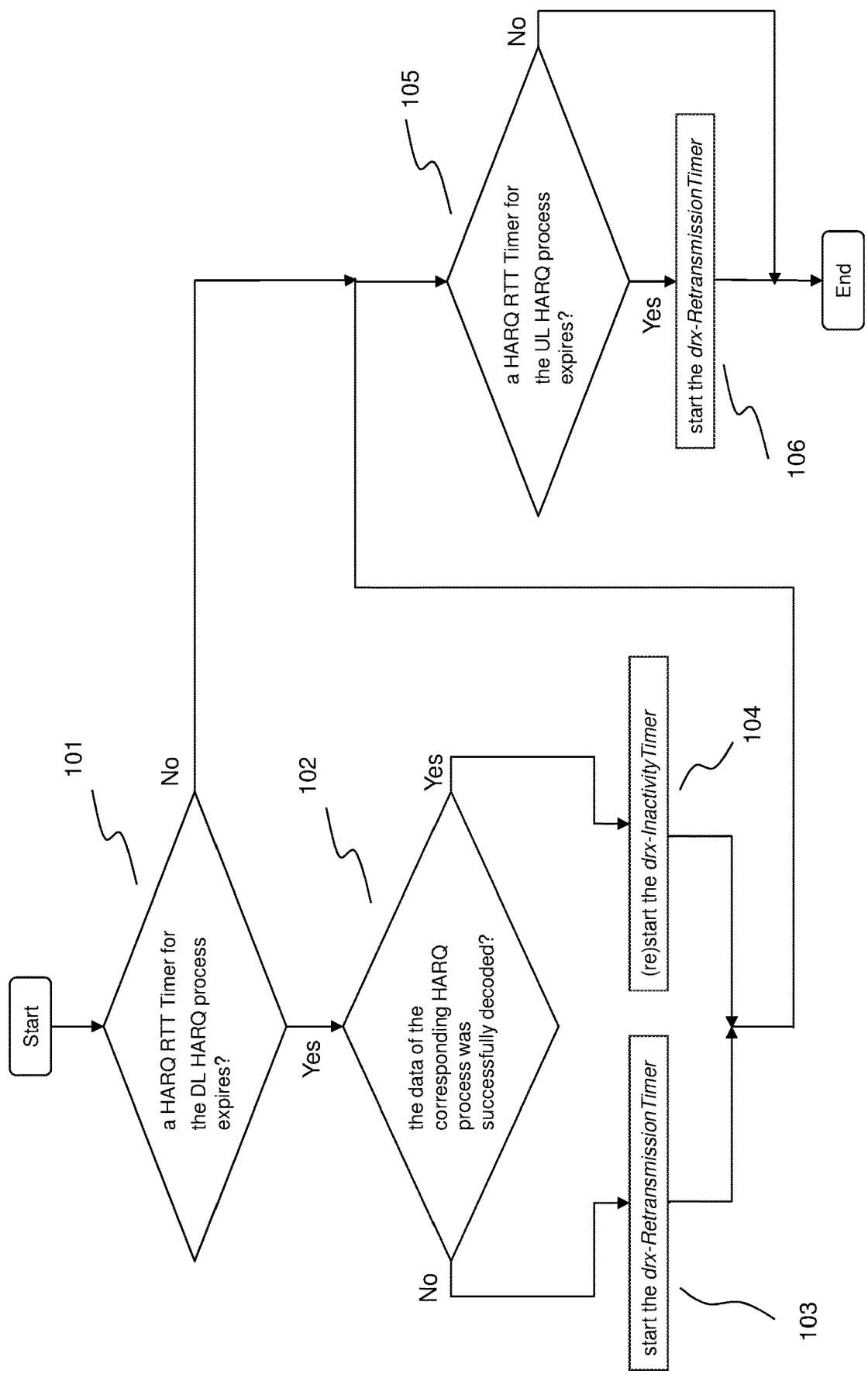
FIG. 1 illustrates a flowchart in accordance with an example embodiment of the application.

Comparing with existing LTE mechanism, uplink (UL) hybrid automatic repeat request (HARQ) for NB-IoT will be asynchronous in the uplink instead of being synchronous as in existing LTE system and scheduled via physical downlink control channel (PDCCH) only without physical HARQ indicator channel (PHICH) for HARQ feedback (thereby excluding non-adaptive retransmissions). In addition, it is likely that only one HARQ process for UL and only one HARQ process for downlink (DL) will be used in order to achieve the cost saving at very low data rate.

In LTE, since release 8 (Rel-8), there are 8 HARQ processes in each direction (uplink and downlink). The benefit of having more than one HARQ process is that continuous transmissions is made possible despite HARQ round trip time (RTT) and the possible occurrence of retransmissions. The drawback is increased buffering requirements and costs. Current discontinuous reception (DRX) operation for LTE is specified in 3GPP TS 36.321 v13.0.0, which is incorporated herein by reference in its entirety, where the inactivity timer is restarted when a PDCCH for new transmission is received. For DL, drx-RetransmissionTimer is started upon HARQ RTT timer expiry and if the transport block (TB) was not successfully decoded. For UL, with synchronized HARQ and non-adaptive retransmission, the user equipment (UE) wakes up when it expects a grant for retransmission. While existing DRX mechanisms cope well with continuous transmissions and 8 HARQ processes, they do not allow power saving to be maximized when only one HARQ process is used.

In an example embodiment, in order to maximize DRX opportunities when only one HARQ process is used, for DL, as the UE has no other choice but to wait HARQ RTT for next transmission opportunity (new or retransmission):

Inactivity timer should not be restarted upon reception of PDCCH for new transmission (HARQ RTT timer is started when a TB is received).

Upon HARQ RTT expiry, retransmission timer is started for PDCCH monitoring for potential retransmissions if the TB is not decoded and inactivity timer is started if the TB is successfully decoded.

Alternatively, if the same length can be used for the monitoring of new transmission and retransmission, the inactivity timer and retransmission timers can be combined into one timer.

In an example embodiment, in order to maximize DRX opportunities when only one HARQ process is used, for UL, HARQ RTT timer is started upon reception of the PDCCH grant:

The UE wakes up for a period of time upon HARQ RTTI timer expiry. Either inactivity timer or retransmission timer can be used but there is no need to have two different timers for UL since the UE would not be able to know which timer to start without PHICH for HARQ feedback. The UE only knows if the TB is successfully received by the evolved NodeB (eNB) until next PDCCH grant is received for new transmission or retransmission.

In an example embodiment, when a DRX cycle is configured and only one HARQ process is used, the Active Time includes the time while:

onDurationTimer or drx-InactivityTimer or drx-RetransmissionTimer or mac-ContentionResolution Timer is running; or a Scheduling Request is sent on physical uplink control channel (PUCCH) and is pending; or a PDCCH indicating a new transmission addressed to the C-RNTI of the MAC entity has not been received after successful reception of a Random Access Response for the preamble not selected by the MAC entity.

But the Active Time does not include the time while an uplink grant for a pending HARQ retransmission can occur and there is data in the corresponding HARQ buffer.

In an example embodiment, when DRX is configured and only one HARQ process is used, the MAC entity shall for each subframe:

if a HARQ RTT Timer for the DL HARQ process expires in this subframe:
  if the data of the corresponding HARQ process was not successfully decoded:
    start the drx-RetransmissionTimer for the corresponding HARQ process.
  else:
    (re)start the drx-InactivityTimer.
if a HARQ RTT Timer for the UL HARQ process expires in this subframe:
  start the drx-RetransmissionTimer for the corresponding HARQ process.
during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap:
  monitor the PDCCH.
  if the PDCCH indicates a DL/UL transmission or if a DL assignment/UL grant has been configured for this subframe:
    start the HARQ RTT Timer for the corresponding HARQ process.
    stop the drx-RetransmissionTimer for the corresponding HARQ process.
  but not start or restart drx-InactivityTimer if the PDCCH indicates a new transmission (DL, UL or sidelink (SL)).

FIG. 1 illustrates a flowchart in accordance with an example embodiment of the application. In the example of FIG. 1, when DRX is configured and only one HARQ process is used, for each subframe, the MAC entity of a UE determines at step 101 whether a HARQ RTT timer for a DL HARQ process expires. If the HARQ RTT timer does not expire, the MAC entity will determine at step 105 whether a HARQ RTT timer for a UL HARQ process expires. If the HARQ RTT timer for the DL HARQ process expires at 101, the MAC entity checks whether the data of the corresponding HARQ process was successfully decoded at step 102. If the data was not successfully decoded, the MAC entity will start the drx-Retransmission Timer at 103 for the corresponding DL HARQ process; if the data was successfully decoded, the MAC entity will (re)start the drx-InactivityTimer at 104. Either way, the MAC entity similarly determines at step 105 whether a HARQ RTT timer for a UL HARQ process expires. If the HARQ RTT timer for the UL HARQ process expires at step 105, the MAC entity will start the drx-RetransmissionTimer at 106 for the corresponding UL HARQ process.

It is noted that as an example, the retransmission timer is used for UL after HARQ RTT timer expiry, it could be inactivity timer as well.

Figure 2:
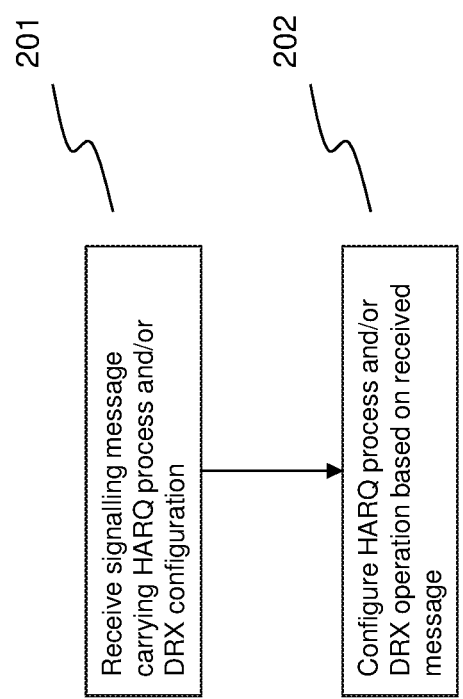
FIG. 2 illustrates a flowchart in accordance with another example embodiment of the application.

In an example embodiment, the above behavior may be configured by the eNB through broadcast signaling or dedicated signaling such as for example, the radio resource control (RRC) message. In another example embodiment, it may be implicitly activated for the UEs belonging to the NB-IoT category. An example embodiment is illustrated in the flowchart of FIG. 2. In FIG. 2, a UE receives signaling message carrying the HARQ process and/or DRX configuration information at step 201 and at step 202, the UE configures the HARQ process and/or DRX operation based on the received information.

Figure 3:
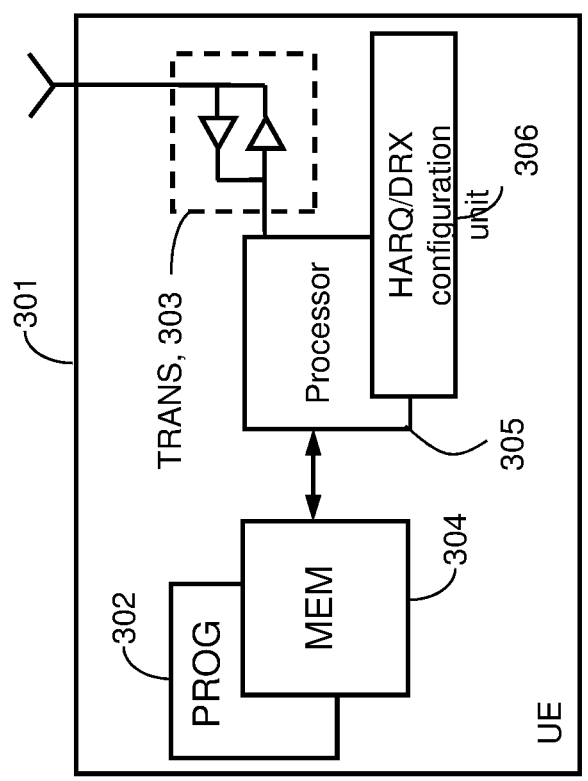
FIG. 3 illustrates a simplified block diagram of an example apparatus that is suitable for use in practicing various example embodiments of this application.

Reference is made to FIG. 3 for illustrating a simplified block diagram of an example apparatus that is suitable for use in practicing various example embodiments of this application. In FIG. 3, a user equipment, UE, 301, is adapted for communication with other network entity, which is not shown for brevity. The UE 301 includes at least one processor 305, at least one memory (MEM) 304 coupled to the at least one processor 305, and a suitable transceiver (TRANS) 303 (having a transmitter (TX) and a receiver (RX)) coupled to the at least one processor 305. The at least one MEM 304 stores a program (PROG) 302. The TRANS 303 is for bidirectional wireless communications with other network entity.

As shown in FIG. 3, the UE 301 may further include a HARQ/DRX configuration unit 306. The unit 306, together with the at least one processor 305 and the PROG 302, may be utilized by the UE 301 in conjunction with various example embodiments of the application, as described herein.

The PROG 302 is assumed to include program instructions that, when executed by the associated processor, enable the electronic apparatus to operate in accordance with the example embodiments of this disclosure, as discussed herein.

In general, the various example embodiments of the apparatus 301 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units, machine type UE or other terminals that incorporate combinations of such functions.

The example embodiments of this disclosure may be implemented by computer software or computer program code executable by the processor 305, or by hardware, or by a combination of software and hardware.

The MEM 304 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor 305 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be optimizing the power saving at low data rate. This is beneficial particularly in the case when just one HARQ process is used.

Embodiments of the present invention may be implemented in software, hardware, application logic or a combination of software, hardware and application logic. The software, application logic and/or hardware may reside on an apparatus such as a user equipment, an eNB or other mobile communication devices. If desired, part of the software, application logic and/or hardware may reside on a network element, part of the software, application logic and/or hardware may reside on a UE 301, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a non-transitory computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention.

Further, the various names, such as for example, the names of timers used for the described parameters are not intended to be limiting in any respect, as these parameters may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:

1. A method comprising:
   determining that a user equipment is a narrow band internet of things, NB-IoT, user equipment;
   determining that a hybrid automatic repeat request round trip time, HARQ RTT, timer expires; and
   starting or restarting a discontinuous reception, DRX, inactivity timer, when it is determined that the user equipment is a NB-IoT user equipment and the HARQ RTT timer expires, further comprising:
   at the user equipment, receiving a control channel message;
   determining that the control channel message indicates a new transmission; and
   forbidding to start or restart the DRX inactivity timer based upon the control channel message indicating a new transmission and the user equipment being a NB-IoT user equipment.

2. The method according to claim 1, further comprising determining that an uplink HARQ RTT timer expires; and starting or restarting the DRX inactivity timer.

3. The method according to claim 1, further comprising:
   at the user equipment, receiving a broadcast or a dedicated signaling indicating information of at least one of HARQ process and DRX configuration, and configuring the DRX inactivity timer based on the received signaling information.

4. The method according to claim 1, further comprising:
   at a network element, generating a control channel message to indicate a new transmission;
   transmitting the control channel message to the user equipment; and
   forbidding to start or restart the DRX inactivity timer.

5. The method according to claim 1, further comprising:
   at a network element, configuring the DRX inactivity timer; and
   transmitting a broadcast or a dedicated signaling indicating information of at least one of HARQ process and DRX configuration, including configuration information of the DRX inactivity timer, to the user equipment.

6. The method according to claim 1, further comprising:
   using just one HARQ process for data communication between the user equipment and the network element.

7. An apparatus, comprising:
   at least one processor; and at least one memory including computer program code, wherein the at least one memory and the computer program code are configured to, with the at least one processor, cause the apparatus at least to
   determine that a user equipment is a narrow band internet of things, NB-IoT, user equipment;
   determine that a hybrid automatic repeat request round trip time, HARQ RTT, timer expires; and
   start or restart a discontinuous reception, DRX, inactivity timer, when it is determined that the user equipment is a NB-IoT user equipment and the HARQ RTT timer expires, wherein the at least one memory and the computer program code are configured to, with the at least one processor, further cause the apparatus at least to:

at the user equipment, receive a control channel message;

determine that the control channel message indicates a new transmission; and forbid to start or restart the DRX inactivity timer based upon the control channel message indicating a new transmission and the user equipment being a NB-IoT user equipment.

8. The apparatus according to claim 7, wherein the at least one memory and the computer program code are configured to, with the at least one processor, cause the apparatus to determine that an uplink HARQ RTT timer expires; and start or restart the DRX inactivity timer.

9. The apparatus according to claim 7, wherein when the apparatus is the user equipment, the at least one memory and the computer program code are configured to, with the at least one processor, cause the apparatus to:

receive a control channel message;

determine that the control channel message indicates a new transmission; and forbid to start or restart the DRX inactivity timer.

10. The apparatus according to claim 7, wherein when the apparatus is the user equipment, the at least one memory and the computer program code are configured to, with the at least one processor, cause the apparatus to:

receive a broadcast or a dedicated signaling indicating information of at least one of HARQ process and DRX configuration, and configure the DRX inactivity timer based on the received signaling information.

11. The apparatus according to claim 7, wherein when the apparatus is a network element, the at least one memory and the computer program code are configured to, with the at least one processor, cause the apparatus to:

generate a control channel message to indicate a new transmission;

transmit the control channel message to the user equipment; and forbid to start or restart the DRX inactivity timer.

12. The apparatus according to claim 7, wherein when the apparatus is a network element, the at least one memory and the computer program code are configured to, with the at least one processor, cause the apparatus to: configure the DRX inactivity timer; and transmit a broadcast or a dedicated signaling indicating information of at least one of HARQ process and DRX configuration, including configuration information of the DRX inactivity timer, to the user equipment.

13. The apparatus according to claim 7, wherein the at least one memory and the computer program code are configured to, with the at least one processor, cause the apparatus to use just one HARQ process for data communication between the user equipment and the network element.

14. A non-transitory computer readable medium comprising program instructions stored thereon for performing at least the following:

determining that a user equipment is a narrow band internet of things, NB-IoT, user equipment;

determining that a hybrid automatic repeat request round trip time, HARQ RTT, timer expires; and starting or restarting a discontinuous reception, DRX, inactivity timer, when it is determined that the user equipment is a NB-IoT user equipment and the HARQ RTT timer expires, the program instructions stored thereon for further performing at least the following:

at the user equipment, receiving a control channel message;

determining that the control channel message indicates a new transmission; and forbidding to start or restart the DRX inactivity timer based upon the control channel message indicating a new transmission and the user equipment being a NB-IoT user equipment.

15. The non-transitory computer readable medium according to claim 14, further comprising program instructions stored thereon for performing:

determining that an uplink HARQ RTT timer expires; and starting or restarting the DRX inactivity timer.

16. The non-transitory computer readable medium according to claim 14, further comprising program instructions stored thereon for performing:

at the user equipment, receiving a control channel message;

determining that the control channel message indicates a new transmission; and forbidding to start or restart the DRX inactivity timer.

17. The non-transitory computer readable medium according to claim 14, further comprising program instructions stored thereon for performing:

at the user equipment, receiving a broadcast or a dedicated signaling indicating information of at least one of HARQ process and DRX configuration, and configuring the DRX inactivity timer based on the received signaling information.

18. The non-transitory computer readable medium according to claim 14, further comprising program instructions stored thereon for performing:

at a network element, generating a control channel message to indicate a new transmission;

transmitting the control channel message to the user equipment; and forbidding to start or restart the DRX inactivity timer.

19. The non-transitory computer readable medium according to claim 14, further comprising program instructions stored thereon for performing:

at a network element, configuring the DRX inactivity timer; and transmitting a broadcast or a dedicated signaling indicating information of at least one of HARQ process and DRX configuration, including configuration information of the DRX inactivity timer, to the user equipment.

20. The non-transitory computer readable medium according to claim 14, further comprising program instructions stored thereon for performing:

using just one HARQ process for data communication between the user equipment and the network element.

* * * * *